US007493850B2

(12) United States Patent
Donahue

(10) Patent No.: US 7,493,850 B2
(45) Date of Patent: Feb. 24, 2009

(54) PISTON

(75) Inventor: Richard J. Donahue, Colgate, WI (US)

(73) Assignee: Dresser, Inc., Addison, TX (US)

( * ) Notice: Subject to any disclaimer, the term of this patent is extended or adjusted under 35 U.S.C. 154(b) by 17 days.

(21) Appl. No.: 11/677,714

(22) Filed: Feb. 22, 2007

(65) Prior Publication Data

US 2008/0000443 A1 Jan. 3, 2008

Related U.S. Application Data

(63) Continuation of application No. 11/265,948, filed on Nov. 3, 2005, now Pat. No. 7,293,497.

(51) Int. Cl.
*F16J 1/04* (2006.01)
*F02F 3/02* (2006.01)

(52) U.S. Cl. .......................................... 92/208; 92/233

(58) Field of Classification Search .................. 92/208, 92/214, 232, 233
See application file for complete search history.

(56) References Cited

U.S. PATENT DOCUMENTS

| | | | |
|---|---|---|---|
| 1,244,566 A | 10/1917 | White | |
| 1,499,073 A | 6/1924 | Pomeroy | |
| 1,568,547 A | 1/1926 | Day | |
| 1,741,032 A | 12/1929 | Minter | |
| 1,885,681 A | 11/1932 | Buren | |
| 2,269,084 A | 1/1942 | McCarthy | |
| 2,352,592 A | 7/1944 | Alexandrescu | |
| 2,709,992 A | 6/1955 | Graves | |
| 2,766,738 A | 10/1956 | Hoffmann | |
| 3,613,521 A * | 10/1971 | Itano | 92/231 |
| 3,703,126 A | 11/1972 | Haug | |
| 3,765,307 A | 10/1973 | Neel, Jr. | |
| 3,892,208 A | 7/1975 | Anderson et al. | |
| 4,011,797 A | 3/1977 | Cornet | |
| 4,073,220 A | 2/1978 | Guenther | |
| 4,074,616 A * | 2/1978 | Gale et al. | 92/222 |
| 4,158,328 A | 6/1979 | Beardmore | |
| 4,161,165 A | 7/1979 | Belush et al. | |
| 4,274,372 A | 6/1981 | Kelm et al. | |
| 4,428,330 A | 1/1984 | Shimizu | |
| 4,617,888 A | 10/1986 | Dent | |
| 4,704,950 A | 11/1987 | Ripberger et al. | |

(Continued)

FOREIGN PATENT DOCUMENTS

DE 37 40 820 C1 1/1989

(Continued)

OTHER PUBLICATIONS

Hastings Manufacturing, "Explanation of Piston and Ring Terms," Website: http://www.hastingsmfg.com/Service%20Tips/piston.htm, printed Feb. 24, 2004, pp. 1-5.

(Continued)

*Primary Examiner*—Thomas E Lazo
(74) *Attorney, Agent, or Firm*—Fish & Richardson P.C.

(57) ABSTRACT

A number of embodiments of a piston may have a shape that provides enhanced piston guidance. In such embodiments, the piston shape may include an axial profile that is configured to provide certain thrust load characteristics.

20 Claims, 7 Drawing Sheets

U.S. PATENT DOCUMENTS

| | | | | |
|---|---|---|---|---|
| 4,716,817 | A | 1/1988 | Ripberger et al. | |
| 4,809,652 | A | 3/1989 | Essig et al. | |
| 4,817,505 | A | 4/1989 | Rhodes | |
| 4,831,919 | A * | 5/1989 | Bruni | 92/233 |
| 4,843,952 | A | 7/1989 | Ripberger | |
| 4,856,417 | A | 8/1989 | Ishikawa | |
| 4,864,986 | A | 9/1989 | Bethel et al. | |
| 5,000,078 | A | 3/1991 | Gabele | |
| 5,054,375 | A | 10/1991 | Kawabata et al. | |
| 5,058,489 | A * | 10/1991 | Iwaya | 92/233 |
| 5,065,715 | A | 11/1991 | Evans | |
| 5,103,784 | A | 4/1992 | Evans | |
| 5,158,008 | A | 10/1992 | Ripberger et al. | |
| 5,172,626 | A | 12/1992 | Hart | |
| 5,193,436 | A | 3/1993 | Hamai et al. | |
| 5,215,052 | A | 6/1993 | Augustin | |
| 5,261,321 | A | 11/1993 | Whitacre | |
| 5,285,755 | A | 2/1994 | Regueiro | |
| 5,299,490 | A | 4/1994 | Harrer et al. | |
| 5,351,665 | A | 10/1994 | Kapus et al. | |
| 5,448,942 | A | 9/1995 | Arai et al. | |
| 5,476,076 | A | 12/1995 | Zhou | |
| 5,487,364 | A | 1/1996 | Takeda et al. | |
| 5,638,787 | A | 6/1997 | Feuling | |
| 5,682,808 | A | 11/1997 | Nakada | |
| 5,701,803 | A | 12/1997 | Lutz | |
| 6,073,602 | A | 6/2000 | Muta | |
| 6,101,990 | A | 8/2000 | Green | |
| 6,240,827 | B1 | 6/2001 | Koike et al. | |
| 6,345,569 | B1 * | 2/2002 | Take et al. | 92/233 |
| 6,357,341 | B1 | 3/2002 | Watanabe et al. | |
| 6,684,844 | B1 | 2/2004 | Wang et al. | |
| 6,883,418 | B1 * | 4/2005 | Greiner | 92/222 |
| 7,293,497 | B2 * | 11/2007 | Donahue | 92/233 |
| 2002/0179032 | A1 | 12/2002 | Ribeiro et al. | |

FOREIGN PATENT DOCUMENTS

| | | | |
|---|---|---|---|
| DE | 38 20 473 | A1 | 12/1989 |
| JP | 401301964 | A | 12/1989 |
| JP | 09 170490 | | 6/1997 |
| JP | 411036978 | A | 2/1999 |

OTHER PUBLICATIONS

SAE Technical Paper Series, Peter Kemnitz, Olaf Maier and Ralph Klein, “Monotherm, a New Forged Steel Piston Design for Highly Loaded Diesel Engines,” SAE paper 2000-01-0924, Copyright 2000 Society of Automotive Engineers, Inc., 11 pages.

SAE Technical Paper Series, Toshiro Yagi and Ichiro Yamagata, “Experimental Method of Determining Piston Profile by Use of Composite Materials,” SAE paper 820769, Copyright 1982 Society of Automotive Engineers, Inc., 12 pages.

Distributed Energy Resources, “Advanced Reciprocating Engines Systems (ARES) Program,” Department of Energy, Feb. 2001, 2 pages.

* cited by examiner

PISTON

CROSS-REFERENCE TO RELATED APPLICATION(S)

This application is a continuation of U.S. patent application Ser. No. 11/265,948 filed on Nov. 3, 2005 now U.S. Pat. No. 7,293,497 by Richard J. Donahue. This prior application is incorporation herein by reference.

STATEMENT REGARDING FEDERALLY SPONSORED RESEARCH AND DEVELOPMENT

The U.S. Government has a paid-up license in this invention and the right in limited circumstances to require the patent owner to license others on reasonable terms as provided for by the terms of DE-FC02-01CH11080 awarded by the Department of Energy.

TECHNICAL FIELD

This document relates to pistons for use in engines or the like.

BACKGROUND

Various types of engines may use pistons in a cylinder bore. Each piston may reciprocate within its associated bore as a portion of the piston's outer circumferential surface is guided by the cylinder wall. The piston may include a skirt that is shaped to bear against the cylinder wall (with a hydrodynamic layer therebetween to provide lubrication) as the piston is reciprocated in the cylinder bore. In general, the lower portion of the piston within the piston skirt is substantially hollow while the upper portion of the piston near the piston face is solid. Accordingly, the piston may have non-uniform thermal expansion and non-uniform rigidity.

Stress concentrations caused by the piston's thermal expansion, flexing, and rocking in the bore may cause the piston to "polish" or otherwise scuff the surface of the cylinder wall after repeated reciprocating movements. Also, thermal expansion of the piston material may increase the contact force between the piston and bore, causing high friction that may result in loss of efficiency and possible seizure of the piston in the cylinder bore. If the outer radius of the piston is too small, the outer circumferential surface may not sufficiently bear against the cylinder wall-causing the piston to excessively rock on the piston pin axis or vibrate within the cylinder bore.

SUMMARY

Certain embodiments of the invention include a piston having a shape that may provide enhanced piston guidance. In such embodiments, the piston shape may include the axial profile configured to focus the thrust reaction forces on the piston skirt so that a skirt force centroid is positioned at an axial height at or slightly below the pivot axis of the piston. Such a configuration is capable of reducing the thrust force moment that would ordinarily cause a rocking motion of the piston. Also, such a configuration may reduce the likelihood of the more rigid portions of the piston causing scuffs along the cylinder wall, thereby permitting a substantially smaller clearance gap between the top land that the cylinder wall.

In some embodiments, an internal combustion engine may include at least one wall defining a bore, and a piston disposed in the bore and coupled to a piston rod to pivot about a pivot axis. The piston may include a substantially circumferential outer surface having a head portion and a skirt portion below the head portion. At least a portion of the outer surface may bear against the wall in a thrust plane when the piston is substantially at operating temperature and subject to a thrust force. The portion of the thrust force borne by the skirt portion in the thrust plane may be definable by a skirt force centroid, and the skirt force centroid may be positioned at an axial height at or below the pivot axis.

A number of embodiments of a piston include a piston for use in an engine having a bore wall so that, when the piston is substantially at operating temperature and subject to a thrust force, the piston pivots about a pivot axis to bear against the bore wall in a thrust plane. The piston may include a substantially circumferential outer surface having a head portion and a skirt portion below the head portion. The head portion may have at least some radii in the thrust plane that are larger than at least some of the radii of the skirt portion when the piston is substantially at operating temperature so that the outer surface has a radial offset in the thrust plane above the pivot axis. The outer surface of the piston may bear at least a portion of the thrust force in the thrust plane. The portion of the thrust force borne by the skirt portion in the thrust plane may be definable by a skirt force centroid, and the skirt force centroid may be positioned at an axial height at or below the pivot axis. The portion of the thrust force borne by the head portion may be definable by a head force centroid, the head force centroid may be substantially smaller in magnitude than the skirt force centroid.

These and other embodiments may be configured to provide one or more of the following advantages. First, the piston shape may provide better guidance within the cylinder bore. Second, the centroid of the thrust reaction forces on the piston skirt may occur at or slightly below the axial height of the pivot axis while the thrust reaction forces on the piston head are relatively small. As such, the thrust force moment that would ordinarily cause a rocking motion of the piston may be reduced. Third, the wear associated with the thrust reaction forces on the piston head may be may be small or insufficient to cause substantial scuffing. As such, the piston may be configured to have a substantially smaller clearance gap between the top land that the cylinder wall, which may reduce undesirable emissions. Moreover, in some circumstances the tighter clearance gap between the top land and the cylinder wall and the lower magnitude of the thrust reaction forces on the piston head may substantially reduce wear on the top land, the piston ring(s), and the cylinder wall.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION OF ILLUSTRATIVE EMBODIMENTS

Figure 1A:
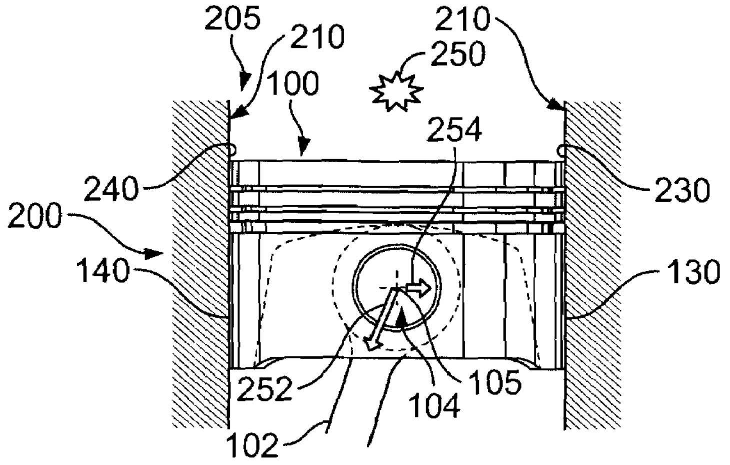
FIG. 1A is a side view of a piston and a portion of an engine in accordance with some embodiments of the invention.
Figure 1B:
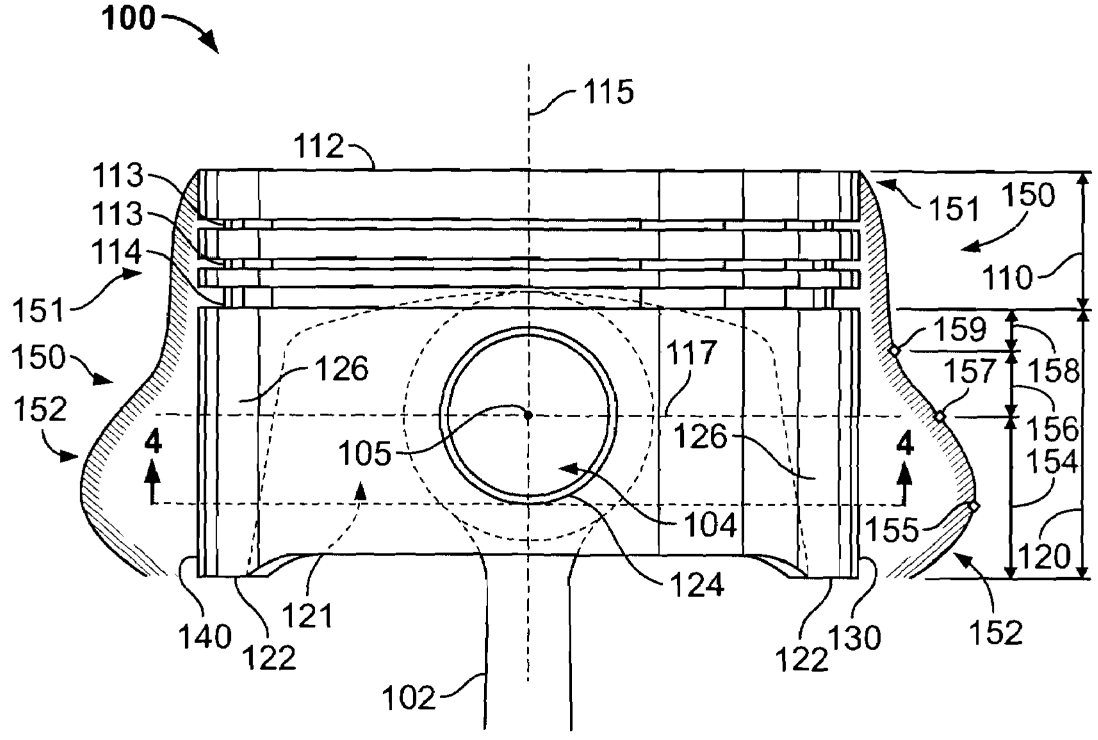
FIG. 1B is a side view of the piston of FIG. 1A.

Referring to FIGS. 1A-B, a piston 100 is capable of reciprocating within a cylinder bore 205 of an engine 200 (a portion of the engine 200 has been removed from FIG. 1A to better view the piston 100). A hydrodynamic layer of oil or other lubricant may coat portions of the cylinder wall 210 to reduce friction between the piston 100 and the cylinder wall 210. The piston 100 may be pivotably engaged with a piston rod 102 using a pin 104. In such circumstances, the piston 100 may pivot about a pivot or pin axis 105 relative to the rod 102. The pin connection permits the piston 100 to transmit forces to, or receive forces from, the rod 102 as the piston 100 reciprocates within the bore 205. In certain embodiments, the piston 100 is constructed in whole or in part from aluminum or alloys containing aluminum, carbon (e.g. carbon fiber and carbon/carbon), iron, steel, or other suitable materials and may include combinations of the above-mentioned or other materials.

Referring to FIG. 1A, the cylinder bore 205 may define at least a portion of a combustion chamber where a combustion event 250 exerts a force on the piston 100 and causes an expansion stroke. The combustion pressure may be transferred to the piston 100 in a direction substantially parallel to the axis of the cylinder bore 205 because at least a portion of the piston's top surface 112 (FIG. 1B) may be substantially perpendicular to the axis of the cylinder bore 205. A portion of the force from the combustion event 250 may be transmitted as a rod force component 252 to the rod 102 (in a longitudinal direction of the rod 102). Also, because the rod 102 may not be aligned with the direction of the combustion force, a portion of the force from the combustion event 250 may be transmitted as a thrust force component 254.

The thrust force 254 may urge a major thrust surface 130 of the piston 100 against a major thrust side 230 of the cylinder wall 210. The thrust force component 254 may be in the thrust plane, which is a plane substantially normal to the pin axis 105 that may extend along a thrust axis 117 (also shown in FIG. 4) through the major thrust surface 130 of the piston 100. The thrust force 254 may generate a moment about the pin axis 105, causing the piston 100 to pivot about the pin axis 105 such that the piston axis 115 is angled from the cylinder bore axis at a rocking angle.

To provide guidance during the reciprocation motion and to limit the rocking angle of the piston 100 (excessive rocking could cause stress concentrations that "polish" or otherwise scuff the cylinder wall 210), the piston 100 may include a skirt portion 120 that bears against the cylinder wall 210—preferably with a hydrodynamic layer of lubricant therebetween. This skirt portion 120 may guide the piston 100 to restrict the rocking motion of the piston 100. In addition, the piston skirt 120 may flex when the thrust force 254 urges the piston 100 against the major thrust side 230 (described in more detail below).

It should be understood that, during the compression stroke (not shown in FIG. 1A), the piston 100 may react to a force from the rod 102 at the pin connection. In some instances, the rod 102 may force the piston 100 to compress the combustion chamber in anticipation of a subsequent combustion event. A reaction component of the force from the rod 102 may be in the form of a thrust force that urges a minor thrust surface 140 of the piston 100 against that minor thrust side 240. Again, in such circumstances, the piston skirt 120 may guide the piston 100 to restrict the rocking motion of the piston 100.

Referring to FIG. 1B, the piston 100 includes a piston head portion 110 and the piston skirt portion 120. The piston head 110 may include a piston top 112 that faces the combustion chamber described above in connection with FIG. 1A. The piston head 110 may include one or more ring grooves, such as one or more compressed-ring mounting grooves 113 (two shown) and one or more oil-ring mounting grooves 114 (one shown). In general, the piston skirt 120 is adjacent the piston head 110 and begins at or about, and extends below, the bottom wall of the lowest ring groove (e.g., ring groove 114 in this embodiments) opposite the piston's top surface 112. The piston skirt 120 includes a generally hollow portion 121 proximal the bottom 122 of the piston 100. The piston skirt 120 may also include pin bores 124 aligned with the pin axis 105 to receive the pin 104. The pin 104 is joined with the pin bores 124 and is disposed in the hollow portion 121 of the skirt 120.

The piston head 110 is generally more rigid than the piston skirt 120, and in some embodiments, may be a solid construction. As such, when the thrust force 254 urges the piston 100 against the major side 230 of the cylinder wall 210, the piston skirt 120 may flex substantially more than the piston head 110. However, the rigidity of the piston skirt 120 is not necessarily constant from the bottom 122 to the piston head 110. For example, in the embodiment shown in FIG. 1B, the circumferential wall 126 that surrounds the hollow portion 121 generally increases in thickness from the bottom 122 toward the piston head 110. In such circumstances, the piston skirt 120 may be more rigid near the piston head portion 110 of the piston 100 (where the wall thickness is greater).

Still referring to FIG. 1B, the axial profile (in the thrust plane) of the piston 100 is depicted schematically at operating temperature using axial profile line 150. Because of differences in temperature at different locations about the piston 100 that occur during operation, the amount of thermal expansion of the piston 100 along its axis may not be uniform. Accordingly, the axial profile of the piston 100 at ambient room temperature (most or all of the piston is at 77° F.) may be different than at operating temperature. The operating temperature is the temperature distribution about the piston 100 that is achieved and maintained when the engine 200 is operated at steady state for an extended time. The operating temperature may vary depending upon the configuration of the engine, but in general, the operating temperature is substantially greater than ambient room temperature. For example, at operating temperature, temperatures of the piston may be in the range of 150° F. to 1000° F., and in some circumstances, in the range of 200° F. to 700° F.

The axial profile line 150 shows changes to the outer circumferential surface of the piston 100 in a direction along the piston axis 115. The axial profile line 150 illustrated in FIG. 1B represents the changes to the outer radius of the piston 100 relative to the axial height in a thrust plane cross-section. As previously described, the thrust plane is substantially normal to the pin axis 105 and may extend along the thrust axis 117 (also shown in FIG. 4) through the major thrust surface 130 of the piston 100. The axial profile line 150 is shown in exaggerated form for illustrative purposes only. It should be understood that the change in the outer radius of the piston 100 may be small relative to the overall size of the piston 100, so the piston 100 may appear substantially cylindrical in shape when viewed from a distance. In this embodiment, the axial profile line 150 along the major thrust surface 130 is similar in shape to the axial profile line 150 along the minor thrust surface 140.

The axial profile line 150 may include a skirt profile line 152 coinciding with the skirt portion 120 and a head profile line 151 coinciding with the piston head portion 110. The head profile line 151 shows that, in this embodiment, the outer radius of the piston progressively decreases near the top surface 112 of the piston 100 (the head profile line 151 shown in FIG. 1B does not depict the exact contours of the piston at the grooves 113 and 114). As such, the shape of the piston head 110 may provide some clearance space between top edge of the piston 100 and the cylinder wall 210. This clearance space may be required to reduce the likelihood of scuffing the cylinder wall 210 when the piston 100 is oriented at its maximum rocking angle. The efficiency of transferring the combustion pressure to the piston 100 may be increased, however, if the clearance space between top edge of the piston 100 and the cylinder wall 210 is reduced. In this embodiment, the piston 100 may be designed to have a reduced clearance space between top edge of the piston 100 and the cylinder wall 210. As described in more detail below, the piston skirt portion 120 may be configured to bear against the cylinder wall 210 and carry a substantial portion of the thrust load when the thrust force 254 urges the piston 100 against the cylinder wall 210. When the piston skirt portion 120 bears against the cylinder wall 210 and provides sufficient guidance to the piston 100, the tendency of the piston 100 to rock about the pin axis 105 may be reduced, which in turn permits a design having a reduced clearance space at the top edge of the piston 100.

Alternatively, the head profile line 151 of the piston head 110 may have a constant outer radius which is smaller than the radius of the skirt portion 120. In such embodiments, some clearance space between top edge of the piston 100 and the cylinder wall 210 would exist. Again, this clearance space can be reduced by causing the piston skirt 120 to bear against the cylinder wall 210 and carry a substantial portion of the thrust load when the thrust force 254 urges the piston 100 against the cylinder wall 210, as described in more detail below.

Still referring to FIG. 1B, at least a portion of the piston's axial profile may change to account for a reduction in the rigidity of the piston 100. As previously described, the piston skirt 120 may be less rigid the than the piston head 110. In such embodiments, the major thrust surface 130 and the minor thrust surface 140 may be shaped to account for the changes in rigidity, for example, by varying the outer radius in the thrust plane as a function of the piston wall thickness, wall flexure, and other factors.

The skirt profile line 152 of the piston 100 includes a lower skirt profile line 154 and an intermediate skirt profile line 156, and some embodiments may also include an upper skirt profile line 158. In this embodiment, at least a portion of the lower skirt profile line 154 may have a convex curvature including a maximum radius point 155. In this embodiment, the maximum radius point 155 represents the location of the maximum outer diameter of the piston's circumferential surface. The maximum radius point 155 may occur along the lower skirt profile line 154 at an axial height above the bottom 122 where the circumferential wall 126 is least rigid. (In some embodiments, the maximum radius point 155 may occur along the lower skirt profile line 154 at or near the bottom 122.) The lowest portion of the lower skirt profile line 154 (e.g., proximal the bottom 122), while perhaps less rigid, may include a convex curvature inward to avoid gouging the cylinder wall 210. The convex curvature of the lower skirt profile line 154 also aids in installation of the piston into the cylinder bore, because it helps to center the piston in the cylinder bore. It should be understood that in other embodiments the lower skirt profile line 154 may include other curvatures or slopes. For example, the lowest portion of the lower skirt profile line 154 may include a substantially linear profile that represents a linear reduction in the piston radius from a location at or about the maximum radius point 155 to a location at or about the piston bottom 122. In other instances, the lowest portion of the lower skirt profile line 154 may include no reduction in the piston radius from a location at or about the maximum radius point 155 to a location at or about the piston bottom 122.

In this embodiment, the intermediate skirt profile line 156 includes a first inflection point 157, at which the lower skirt profile line 154 joins the intermediate skirt profile line 156. At least a portion of the intermediate skirt profile line 156 includes a concave curvature, but it should be understood that other portions of the intermediate skirt profile line 156 may include other curvatures or slopes. This concave curvature may account for substantial changes in rigidity in the intermediate portions of the piston skirt 120 caused, for example, by substantial changes in the thickness of the circumferential wall 126.

In this embodiment, the intermediate skirt profile line 156 also includes a second inflection point 159, at which the upper skirt profile line 158 joins the intermediate skirt profile line 156. At least a portion of the upper skirt profile line 158 may include a convex curvature that meets with the piston head profile line 151. The profile line 158 can be other shapes, however. For example, the upper skirt profile line 158 can have a substantially constant slope from a location at or about the second inflection point 159 to a location at or about the beginning of the piston head 110. In the embodiment of FIG. 1B, none of the radii of the piston head profile line 151 in the thrust plane are larger than the radii of the upper skirt profile line 158 in the thrust plane. In other embodiments, some radii of the piston head profile line 151 in the thrust plane are larger than the radii of the upper skirt profile line 158 in the thrust plane. Also in the embodiment of FIG. 1B, none of the radii of the upper skirt profile line 158 in the thrust plane are larger than the radii of the intermediate skirt profile line 156 in the thrust plane.

Figure 2:
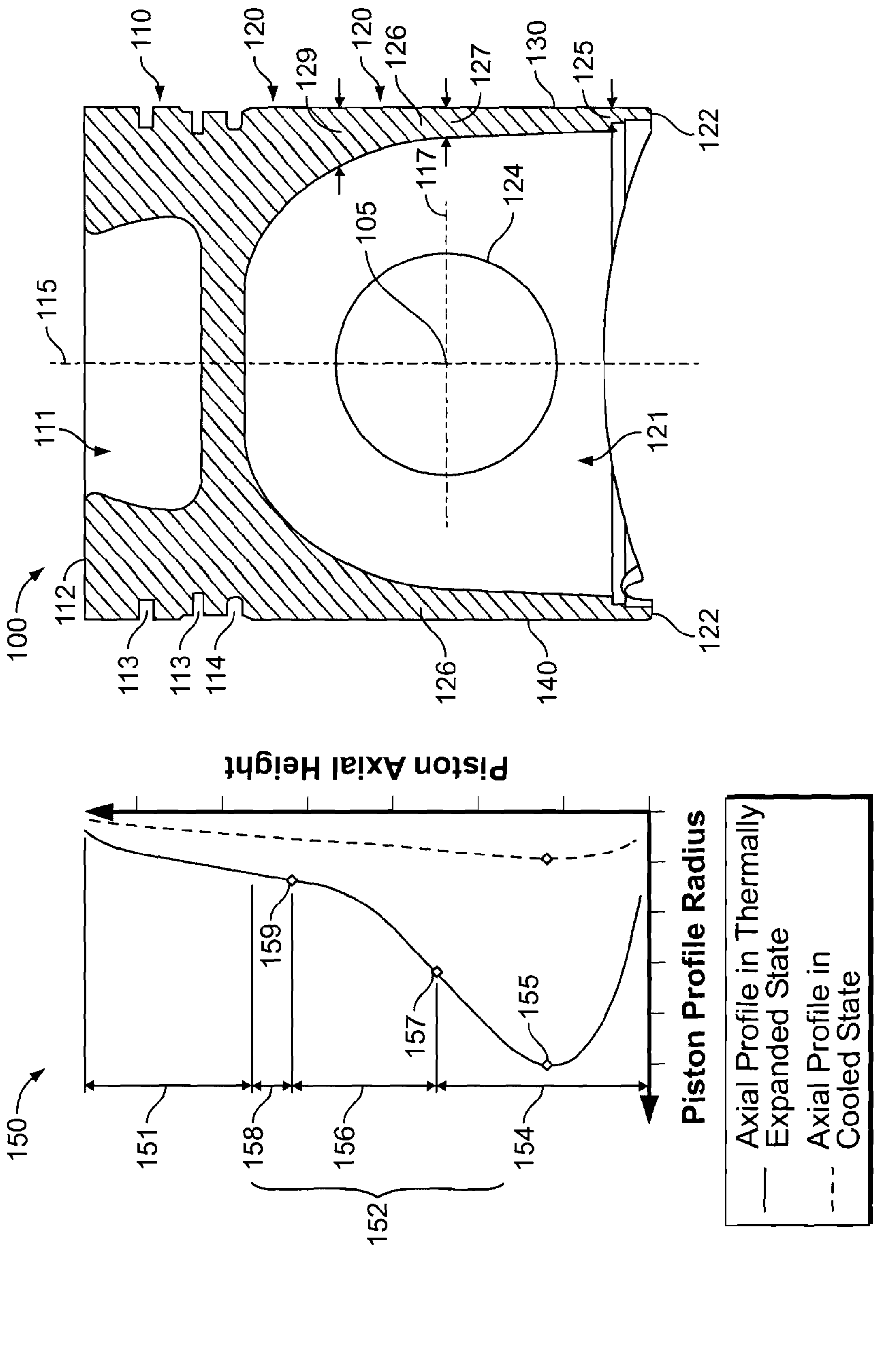
FIG. 2 is a cross-sectional view of a piston in accordance with some embodiments of the invention.

Referring now to FIG. 2, the axial profile line 150 of the piston 100 may be represented on a plot showing the radius in the thrust plane relative to the axial height from the piston bottom 122. The plot in FIG. 2 illustrates the axial profile of the piston 100 both at or about operating temperature and at or about room temperature. As previously described, the axial profile of the piston 100 may be different depending on whether the piston 100 is at or about operating temperature or at or about ambient room temperature. For example, the intermediate skirt profile line 156 may be generally convex or linear when the piston is at or about room temperature (refer, for example, to the dotted line on the plot in FIG. 2), but due to thermal expansion of the circumferential wall, the intermediate skirt profile line 156 may adjust to include the concave curvature as it approaches operating temperature (refer, for example, the solid line on the plot in FIG. 2). In other embodiments, the intermediate skirt profile line 156 may include a concave curvature both when the piston 100 is in a thermally expanded state and when the piston 100 is in a cooled state.

FIG. 2 also shows the thrust plane cross-section of the piston 100, which includes the circumferential wall 126 surrounding the hollow portion 121. The circumferential wall 126 varies in thickness in a direction along the piston axis 115, which may affect the rigidity of the piston skirt 120 at certain axial heights. In one example, the lower skirt portion may include a point at which the wall thickness 125 is approximately 0.19 inches, the intermediate skirt portion may include a point at which the wall thickness 127 is approximately 0.34 inches, and the upper skirt portion may include a point at which the wall thickness 129 is approximately 0.61 inches. Because a greater wall thickness can increase the radial rigidity of the circumferential wall 126, the upper skirt point may have substantially greater radial rigidity than the lower skirt point. In addition, the piston skirt 120 can include pin bores 124 aligned with the pin axis 105 to receive the pin 104, which may affect the rigidity of the piston skirt at certain axial heights.

As previously described, the skirt profile line 152 may be shaped to account for the changes in rigidity of the piston skirt from the lower skirt portion to the upper skirt portion. In such embodiments, some flexible portions of the piston skirt 120 may have larger radii in the thrust plane so as to flex when exposed to a thrust load and to cause the piston skirt 120 to bear against the cylinder wall 210 with a more uniform load distribution. For example, the lower portion of the piston skirt 120 may be more flexible and therefore may have a maximum radius point 155 in interference with the cylinder wall 210 at operating temperatures. Because of the flexure in the lower portion of the piston skirt 120, however, the unit area loading about the piston skirt's lower portion is substantially similar to the unit area loading about the skirt's upper portion (i.e. the more rigid, upper portion of the skirt 120 may not bear against the cylinder wall 210 with a substantially greater portion of the thrust load).

Still referring to FIG. 2, the piston 100 may optionally include a combustion bowl 111. The combustion bowl 111 may be used to optimize the combustion characteristics in the combustion chamber of an engine. For example, a combustion bowl 111 may be used in a piston of a gasoline engine, diesel engine or natural gas engine. In such embodiments, the combustion bowl 111 does not significantly affect the rigidity of the piston head 110, and the piston head 110 remains substantially more rigid than portions of the piston skirt 120. In this embodiment, the piston head profile line 151 shows that the radius of the piston head 110 in the thrust plane is smaller than those more flexible portions of the piston skirt 120.

Figure 3:
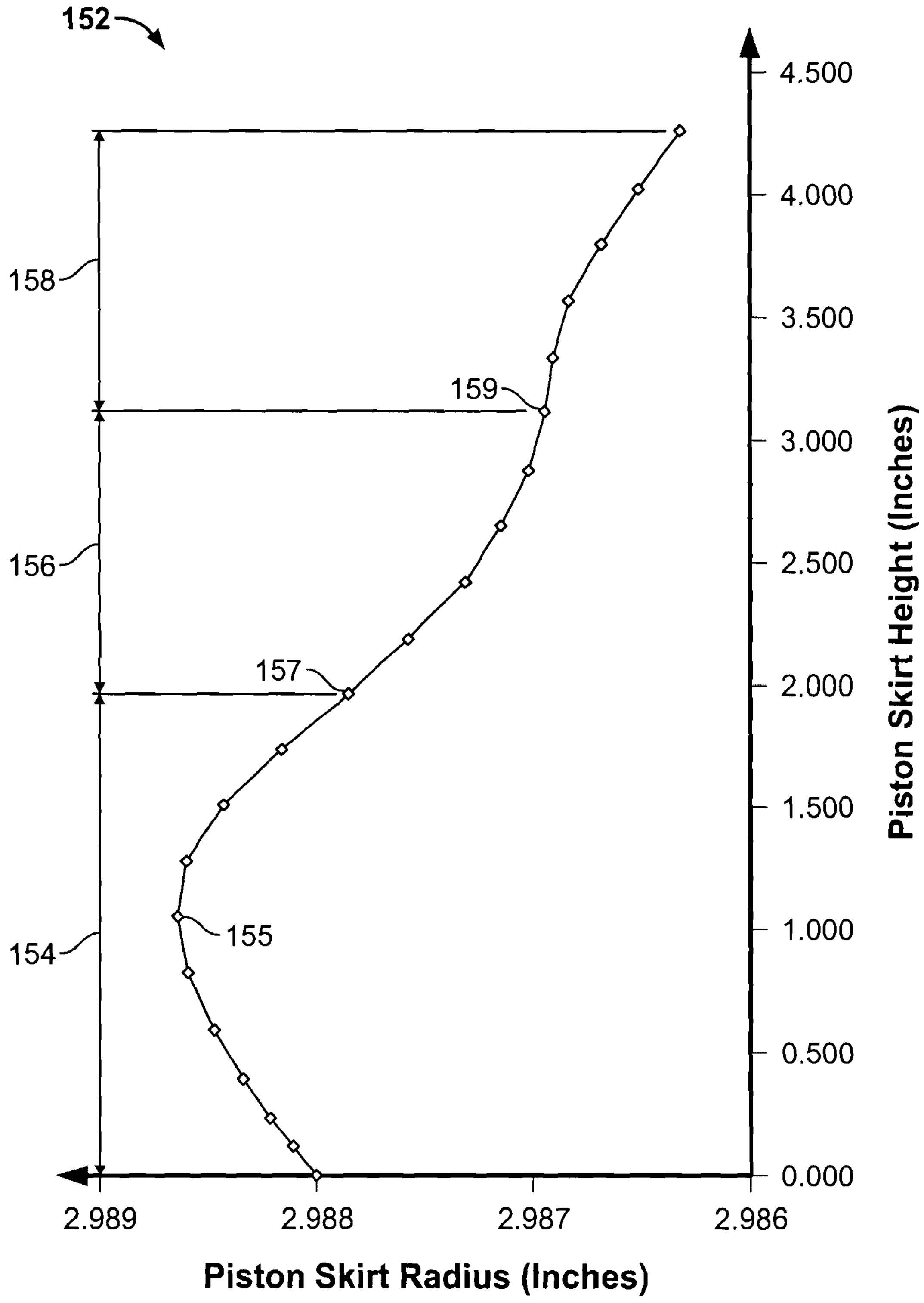
FIG. 3 is a diagram showing an example of an axial profile of a piston skirt in accordance with an embodiment of the invention.

FIG. 3 shows one example of the piston skirt profile line 152 represented in a plot where the piston 100 is at or about operating temperature. Because the scale for the piston skirt radius has been limited to a range of 2.986 to 2.989 inches in this example, the shape of the skirt profile line 152 has been exaggerated. It should be understood that the dimensional scales shown in FIG. 3 are for illustrative purposes only, and that other embodiments may include a piston having various dimensions not illustrated in FIG. 3. Furthermore, it should be understood that the axial profile's curvature, proportion, and shape shown in FIG. 3 are for illustrative purposes only, and that other embodiments may include an axial profile having various curvatures, proportions, and shapes not illustrated in FIG. 3. In this example, the piston skirt profile line 152 shows a general decrease in skirt radius from the maximum radius point 155 toward the upper skirt portion. This decrease in skirt radius generally follows the flexibility of the piston skirt in this example, and the change in rate of decreasing radius coincides with a flexible-to-rigid transition of the piston skirt.

Referring to FIG. 3, the lowest portion of the lower skirt profile line 154 (e.g., near the bottom at axial height=0.000) includes a convex curvature inward to avoid gouging the cylinder wall 210 during the reciprocating motion of the piston 100. In this example, the lower skirt profile line 154 includes the maximum radius point 155 at an axial height above the bottom where the piston skirt 120 is least rigid. As previously described, at least a portion of the intermediate skirt profile line 156 may include a concave curvature. Such a concave curvature may, for example, represent a substantial change of the piston skirt's radii in the thrust plane due to a substantial change in the rigidity of the piston skirt. In this example, the intermediate skirt profile line 156 meets with the upper skirt profile line 158 at a second inflection point 159 and extends toward the head profile line (not shown in the example in FIG. 3).

As shown in the example in FIG. 3, the skirt profile line 152 may be shaped to account for the changes in rigidity of the piston skirt 120 from the lower skirt portion to the upper skirt portion, and such a configuration may permit the piston skirt 120 to bear against the cylinder wall 210 with a more uniform load distribution. In this embodiment, the concave curvature along a portion of the skirt profile line 152 (e.g., along the intermediate skirt profile line 156) can be a part of the piston design that permits the substantially uniform distribution of the thrust load along the piston skirt 120. If, on the other hand, the piston skirt profile line 152 included a single convex curvature (when the piston is at or about operating temperature) that extended the entire axial height of the skirt, the upper portion of the skirt may carry a significantly greater unit area load than the lower skirt portion due to the thrust load. This substantially non-uniform distribution of the thrust load may cause the piston to "polish" or otherwise scuff the cylinder wall (because the upper skirt portion may apply a greater unit area load to the cylinder wall without flexing like the lower skirt portion).

In some embodiments, including the previously described embodiments, the lower portion of the piston skirt 120 may include a maximum radius 155 in the thrust plane that is sized to be in interference with the cylinder wall 210 at operating temperatures. In such embodiments, no seizure of the piston 100 would occur due to flexure in the lower portion of the piston skirt 120. The lower portion of the piston skirt 120 flexes such that the lower portion of the skirt 120 is spring-loaded against the major thrust side 230 and the minor thrust side 240 of the cylinder wall 210. This interaction causes the lower portion of the skirt 120 to contribute in distribution of the thrust load, thereby distributing some of the load that might otherwise be applied at the upper skirt portion or at the head portion 110. By creating a more uniform load distribution along the piston skirt 120, the likelihood of generating local areas of relatively high stress concentrations is reduced, which in turn can reduce the likelihood of "polishing" or otherwise scuffing the cylinder wall 210.

Also in some embodiments, the piston 100 is provided with better guidance because the lower portion of the skirt 120 is spring-loaded against the major and minor thrust sides 230 and 240 of the cylinder wall 210 at operating temperatures. As previously described, when the piston skirt portion 120 bears against the cylinder wall 210 in such a manner and provides sufficient guidance to the piston 100, the tendency of the piston 100 to rock about the pin axis 105 may be reduced, which in turn permits a design having a minimal clearance space between the piston head 110 and the cylinder wall 210. In such circumstances, it is possible that friction may be added to the system when the lower portion of the skirt 120 is spring-loaded to bear against the major and minor thrust sides 230 and 240 of the cylinder wall 210 at operating temperatures. However, this added friction may be negligible because a break in the hydrodynamic layer of lubricant between the cylinder wall 210 and the piston skirt 120 does not necessarily occur. Furthermore, these embodiments may provide a more uniform load distribution between the upper and lower portions of the skirt 120 (previously described), which may reduce the friction caused by "polishing" or otherwise scuffing the cylinder wall 210. Such a reduction in "polishing" friction may offset any friction potentially added by the lower portion of the piston skirt 120 being spring-loaded to bear against the major and minor thrust sides 230 and 240 of the cylinder wall 210 at operating temperatures.

Figure 4:
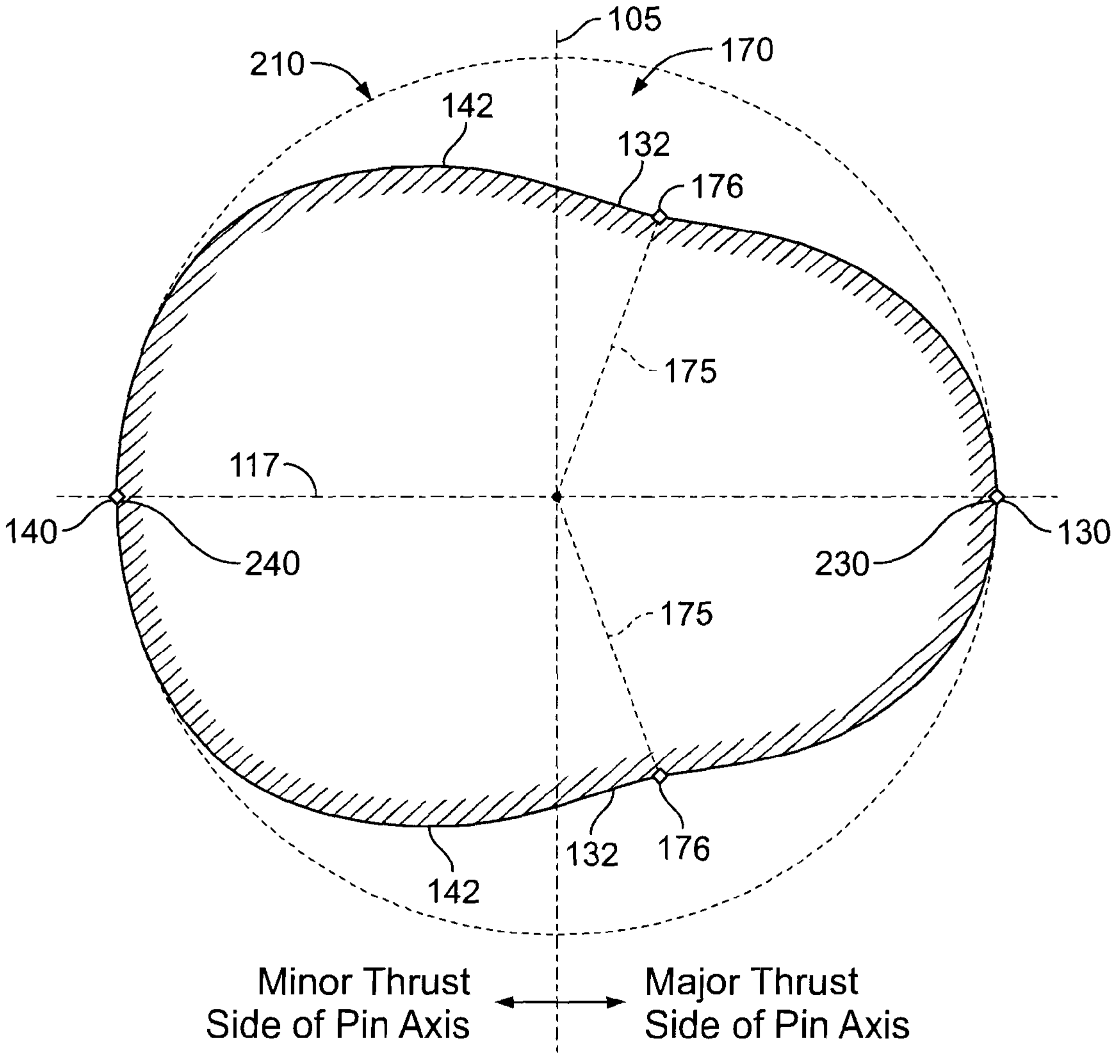
FIG. 4 is a schematic view of a cross-section of a piston in accordance with some further embodiments of the invention.

Referring to FIG. 4, the polar profile line of the piston 100 at or about operating temperature is schematically depicted with a polar profile line 170. The polar profile line 170 shows the shape of the outer circumferential surface of the piston 100 in a cross-sectional radial plane. In this embodiment, the polar profile line 170 is shown in a radial plane cross-section in the lower portion of the piston skirt 120 (see the cross-section line in FIG. 1). The general shape of the polar profile line 170 may be similar even if another radial plane cross-section is taken in another portion of the piston skirt 120. The size of the radii in the polar profile in another radial plane may be in proportion to the outer radius at the major and minor thrust surfaces 130 and 140 as shown in the axial profile line 150 and substantially follow the shape as shown in FIG. 4.

The polar profile line 170 is shown in exaggerated form for illustrative purposes only. It should be understood that changes in outer radius of the piston 100 in the radial plane may be small relative to the overall size of the piston 100, so the piston 100 may appear to have a circular cross-sectional shape when viewed from a distance. Various embodiments of the piston 100 may include piston skirts having cross-sectional shapes that do not perfectly coincide with the cross-sectional shape of the cylinder bore 205. In the embodiment shown in FIG. 4, the cross-sectional circumferential shape of the piston skirt 120 is somewhat like a modified ellipse and is not symmetrical about the pin axis 105. In other embodiments, the cross-sectional circumferential shape may have a different appearance, such as an ellipse or a modified ellipse that is symmetrical about the pin axis 105.

Referring to FIG. 4, the piston 100 may have a polar profile design that is asymmetrical about a pin axis 105. In this embodiment, the outer circumferential surface of the piston skirt 120 in the cross-sectional radial plane has a modified elliptical shape that is substantially symmetrical about the thrust axis 117. The maximum radii in the polar profile line 170 occur at the major thrust surface 130 and the minor thrust surface 140. In this radial plane, the major thrust surface 130 and the minor thrust surface 140 are sufficiently sized to bear against the cylinder wall 210 along a major thrust side 230 and a minor thrust side 240, respectively. Such interaction between the piston skirt 120 and the cylinder wall 210 may cause the skirt 120 flex inward in a direction of the thrust axis 117 and correspondingly flex outward in a direction of pin axis 105. For example, when the thrust force 254 (FIG. 1) urges the major thrust surface 130 against the major thrust side 230 of the cylinder wall 210, the major thrust surface 130 of the piston skirt may flex inward. This inward flexure causes the piston skirt 120 to flex outward in the direction of the pin axis 105. To allow clearance for this outward flexure in the direction of the pin axis 105, the radii along the non-thrust surfaces 132 and 142 of the piston skirt 120 may be smaller than the radii along the major and minor thrust surfaces 130 and 140 and may be smaller than the radius of the cylinder bore 205 at operating temperatures.

The thrust loads on the major thrust surface 130 may be greater than on the minor thrust surface 140, so the piston skirt 120 may not uniformly flex outward. In such embodiments, the minimum radius 175 may not extend in a direction parallel to the pin axis 105 but instead may extend toward the major thrust side of the pin axis 105 (e.g., the minimum radius point 176 in the polar profile line 170 is away from the pin axis 105 and toward the major thrust surface 130). In this embodiment, polar profile line 170 is substantially symmetrical about the thrust axis 117, so the minimum radius point 176 exists on both sides of the thrust axis 117. Because the thrust loads on the major thrust surface 130 may be greater than on the minor thrust surface 140, the piston skirt 120 may flex outwardly more on the major thrust side than on the minor thrust side. To account for this non uniform flexure of the piston skirt 120, many of the radii on the minor thrust side of the pin axis 105 may be relatively larger than the counterpart radii on the major thrust side of the pin axis 105. The relatively larger radii on the minor thrust side can provide a greater surface area to bear against the cylinder wall 210 and guide the piston 100. The minimum radius 175 on the major thrust side of the pin axis 105 may account for the outward flexure of the piston skirt 120 caused by the greater loading on the major thrust side of the pin axis 105.

Figure 5:
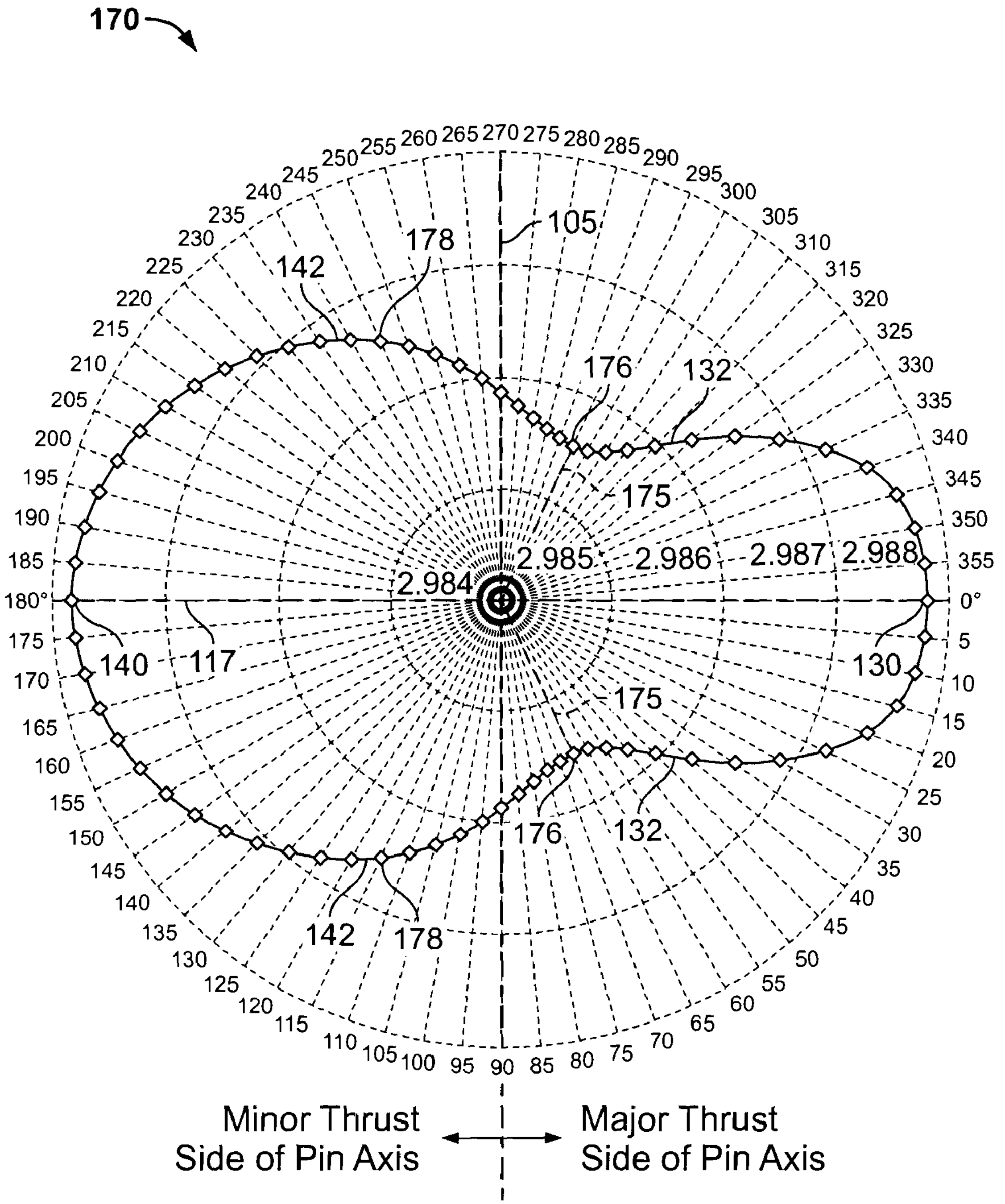
FIG. 5 is a diagram showing an example of a polar profile of a piston in accordance with an embodiment of the invention.

FIG. 5 shows one example of the polar profile line 170 (for a piston 100 at or about operating temperature) represented in a plot. Because the scale for the piston skirt radius has been limited to a range of 2.984 to 2.988 inches in this example, the shape of the polar profile line 170 has been exaggerated. It should be understood that the dimensional scales shown in FIG. 5 are for illustrative purposes only, and that other embodiments may include a piston having various dimensions not illustrated in FIG. 5. Furthermore, it should be understood that the polar profile's curvature, proportion, and shape shown in FIG. 5 are for illustrative purposes only, and that other embodiments may include a polar profile having various curvatures, proportions, and shapes not illustrated in FIG. 5. In this example, the polar profile line 170 shows that the outer circumferential surface of the piston skirt 120 in the cross-sectional radial plane has a modified elliptical shape which is asymmetrical about the pin axis 105 (and substantially symmetrical about the thrust axis 117).

Referring to FIG. 5, in this example, many of the radii on the minor thrust side of the pin axis 105 may be relatively larger than the counterpart radii on the major thrust side of the pin axis 105. For example, the minimum radius 175 has a length of about 2.9855 inches and occurs at a point 176 on the major thrust side of the pin axis 105 at angle of about 25-degrees from the pin axis 105. The counterpart radius has a length of about 2.9865 inches and occurs at a point 178 on the minor thrust side of the pin axis 105 at an angle of about 25-degrees from the pin axis 105. The maximum radius in this polar profile has a length of about 2.9878 inches and occurs at the major and minor thrust surfaces 130 and 140. The radii along the non-thrust surfaces 132 and 142 are less than this maximum radius to provide clearance for the outward flexure of the piston skirt 120 in the direction of the pin axis 105.

Other embodiments of the piston may include a polar profile that is not illustrated in FIG. 4 or FIG. 5. For example, a piston may include the axial profile shown in FIG. 1, FIG. 2, or FIG. 3 and may also include a polar profile having a modified elliptical shape that is asymmetrical about the pin axis 105. In another example, a piston may include the axial profile shown in FIG. 1, FIG. 2, or FIG. 3 and may also include a polar profile having an elliptical shape that is symmetrical about the pin axis 105. In embodiments having a symmetrical polar profile, the minimum radius may occur along the pin axis 105 and the maximum radius may occur along the thrust axis 117 at the major and minor thrust sides.

Figure 6:
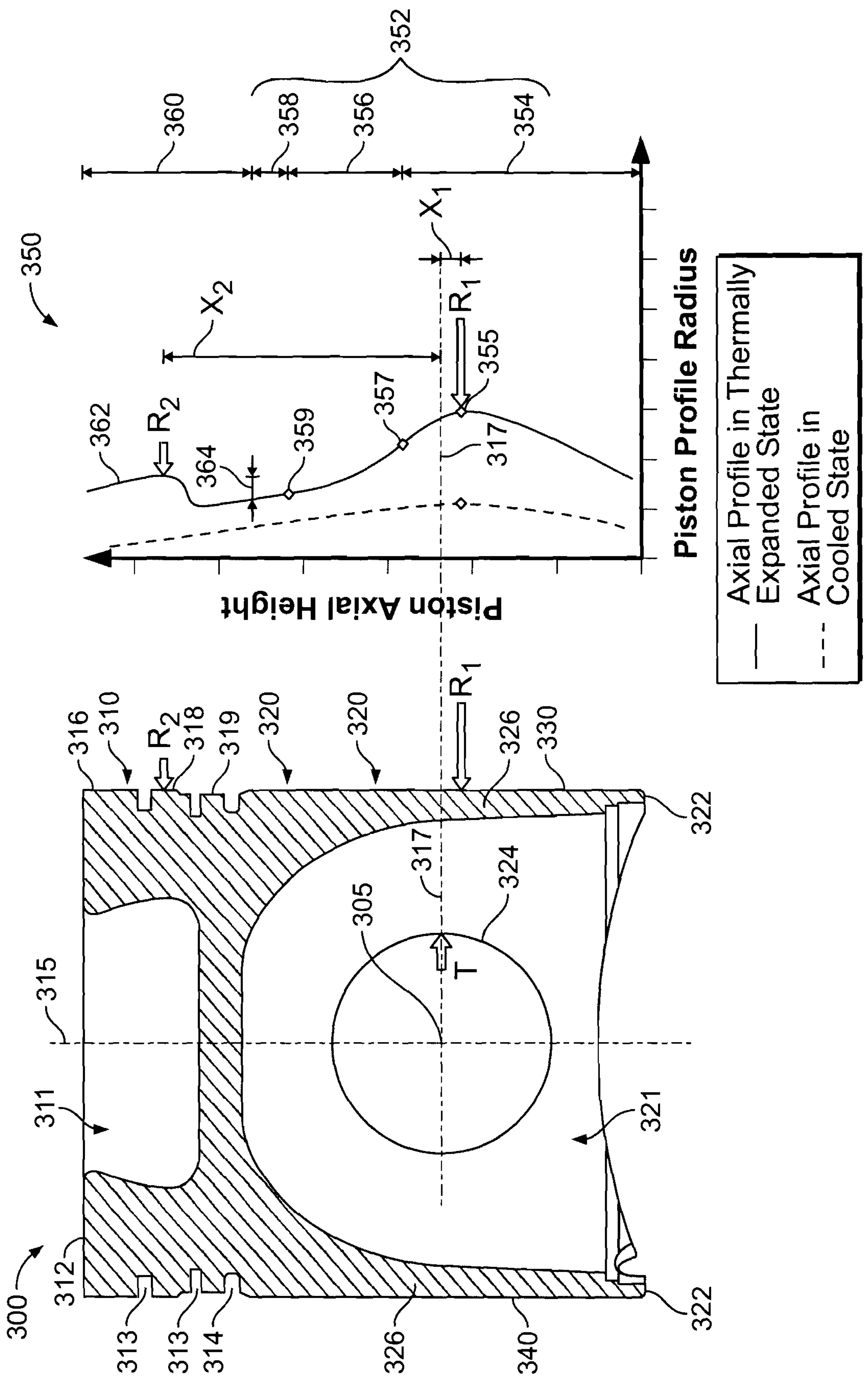
FIG. 6 is a cross-sectional view of a piston in accordance with some embodiments of the invention.

Referring now to FIG. 6, some embodiments of a piston 300 may be configured so that the centroid of the thrust reaction forces imposed on the major thrust side of the piston 300 is located proximal to the center line 317 of the wrist pin. Such a configuration is capable of reducing the thrust force moment that would ordinarily cause a rocking motion of the piston 300. It should be understood that, in these embodiments, the thrust load is not necessarily distributed in a perfectly uniform manner along the entire major thrust side 330 of the piston skirt 320. Even if some portions of the major thrust side 330 of the piston skirt 320 bear a greater share of the thrust load, the piston 300 can be configured such that the primary centroid of the reaction forces (represented as force centroid R1) is located at or slightly below the centerline height of the wrist pin. Such a configuration may effectively focus the thrust load to the more flexible portion of the piston skirt (the lower skirt portion in this embodiment) and away from the more rigid portions of the piston (the upper skirt portion and the piston head in this embodiment). This may reduce the likelihood of the more rigid portions of the piston causing scuffs along the cylinder wall, thereby permitting a substantially smaller clearance gap between the top land 316 that the cylinder wall. Furthermore, the thrust load may be concentrated below the ring grooves 313 and 314 where, in some embodiments, there is a more generous supply of engine oil or other lubricant to cushion the thrust load.

FIG. 6 shows a cross-sectional view of the piston 300 in the thrust plane. The piston 300 may have some similar features to the previously described embodiments, but the piston 300 has a different axial profile 350. The piston may include a head portion 310, a skirt portion 320, a pin axis 305 and a piston axis 315. The head portion 310 may have a combustion bowl 311, a top surface 312, and ring grooves 313 and 314 that operate similar to the previously described embodiments. The skirt portion 320 may have a circumferential wall 326 that at least partially surrounds a hollow portion 321 proximal to the bottom 322 of the piston 300. The skirt portion 320 may include a major thrust side 330 and a minor thrust side 340 that may slidably engage the cylinder wall of an engine, similar to the previously described embodiments.

The axial profile line 350 of the piston 300 may be represented on a plot showing the radius in the thrust plane relative to the axial height from the piston bottom 322. The plot in FIG. 6 illustrates the axial profile of the piston 300 at or about operating temperature (refer to the solid line) and at or about ambient room temperature (refer to the dashed line). As previously described, the axial profile 350 of the piston 300 may be different depending on whether the piston 300 is at or about operating temperature or at or about ambient room temperature. In this embodiment, the intermediate skirt profile 356 may be generally convex or linear when the piston is in a cooled state, but due to thermal expansion of the circumferential wall, the intermediate skirt profile 356 may adjust to include the concave curvature. In other embodiments, the intermediate skirt profile 356 may include a concave curvature both when the piston 300 is in a thermally expanded state and when the piston 300 is in a cooled state.

Still referring to FIG. 6, the piston skirt profile may include a lower skirt profile line 354, the intermediate skirt profile line 356, and an upper skirt profile line 358. In this embodiment, at least a portion of the lower skirt profile line 354 may have a convex curvature including a maximum radius point 355. It should be understood that in other embodiments the lower skirt profile line 354 may include other curvatures or slopes. For example, the lowest portion of the lower skirt profile line 354 may include a substantially linear profile that represents a linear reduction in the piston radius from the maximum radius point 355 to the piston bottom 322. In other instances, the lowest portion of the lower skirt profile line 154 may include no reduction in the piston radius from a location at or about the maximum radius point 355 to a location at or about the piston bottom 322.

The intermediate skirt profile line 354 may include a first inflection point 357, at which the lower skirt profile line 354 joins the intermediate skirt profile line 356. At least a portion of the intermediate skirt profile line 356 includes a concave curvature when the piston 300 is at or about operating temperature. Such a concave curvature may, for example, represent a substantial change of the piston skirt's radii in the thrust plane due to a substantial change in the rigidity of the piston skirt 320. It should be understood that other portions of the intermediate skirt profile line 356 may include other curvatures or slopes. The intermediate skirt profile line 356 may also include a second inflection point 359, at which the upper skirt profile line 358 joins the intermediate skirt profile line 356. At least a portion of the upper skirt profile line 358 may include a convex curvature or a linear slope that meets with the piston head profile line 360.

In this embodiment, at least some of the radii of the piston head profile line 360 in the thrust plane are larger than the radii of the upper skirt profile line 358 in the thrust plane. For example, the radii along a portion of the top land 316 and the second land 318 may be greater than some of the radii of the upper skirt 358 when the piston 300 is at or about operating temperature, as shown in the offset portion 362 of the piston head profile line 360. Also, in some embodiments the radii along the third land 319 may be substantially less than that of the top land 316 and the second land 318. Such a configuration may cause a radial offset 364 between the upper skirt and the piston head, which may be used to focus the centroid of the thrust reaction forces on the piston skirt 320 (represented as force centroid R1) to an axial position at or slightly below the centerline 317 of the wrist pin (described in more detail below).

Figure 7:
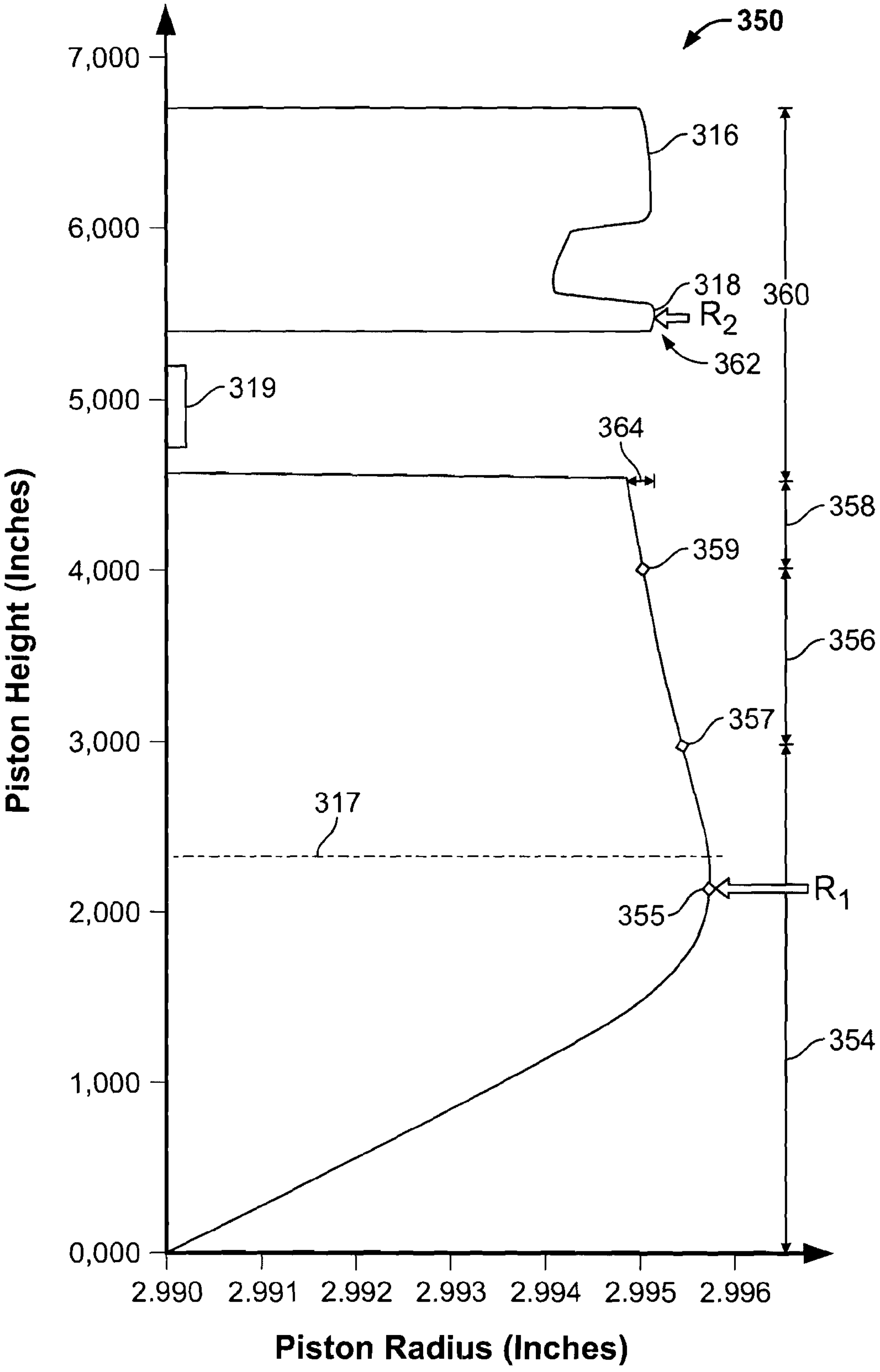
FIG. 7 is a diagram showing an example of an axial profile of a piston head and piston skirt in accordance with an embodiment of the invention.

FIG. 7 shows one example of the axial profile line 350 represented in a plot where the piston is at or about operating temperature. Because the scale for the piston skirt radius has been limited to a range of 2.990 to 2.996 inches in this example, the shape of the axial profile line 350 has been exaggerated. It should be understood that the dimensional scales shown in FIG. 7 are for illustrative purposes only, and that other embodiments may include a piston having various dimensions not illustrated in FIG. 7. Furthermore, it should be understood that the axial profile's curvature, proportion, and shape shown in FIG. 7 are for illustrative purposes only, and that other embodiments may include an axial profile having various curvatures, proportions, and shapes not illustrated in FIG. 7. In this example, the lowest portion of the lower skirt profile line 354 (e.g., near the bottom 322 at axial height=0.000) includes a convex curvature inward or a linear slope inward to avoid gouging the cylinder wall during the reciprocating motion of the piston 300 and to avoid, in some circumstances, an interference fit when the piston 300 is at ambient room temperature. As previously described, at least a portion of the intermediate skirt profile line 356 may include a concave curvature between inflection points 357 and 359. In this embodiment, at least some of the radii in the piston head profile 360 are greater than some of the radii in the upper skirt profile 358, which creates a radial offset 364 when the piston 300 is at or about operating temperature.

In the embodiments and examples described in connection with FIGS. 6-7, the lower portion of the piston skirt 320 may include a maximum radius (e.g., point 355) in the thrust plane that is sized to be in interference with the cylinder wall at operating temperatures. As previously described, no seizure of the piston 300 would occur due to flexure in the lower portion of the piston skirt 320. The lower portion of the piston skirt 320 is capable of flexing so that the lower portion of the skirt 320 is spring-loaded against the major thrust side and the minor thrust side of the cylinder wall. This interaction causes the lower portion of the skirt 320 to bear a substantial portion of the thrust reaction forces. Moreover, the axial profile line 350 of the piston 300 in a thermally expanded state may be configured so that the radial offset 364 reduces the thrust reaction forces upon the upper skirt portion 356 (e.g., some portion of the upper skirt may not even contact the cylinder wall) and focuses the thrust reaction forces so that a centroid (represented as force centroid R1) is located at or slightly below the centerline 317 of the wrist pin (e.g., located at an axial height at or below the pivot axis 305). Such a configuration is capable of reducing the thrust force moment that would ordinarily cause a rocking motion of the piston 300. Also, such a configuration may reduce the likelihood of the more rigid portions of the piston 300 causing scuffs along the cylinder wall, thereby permitting a substantially smaller clearance gap between the top land 316 that the cylinder wall. In such circumstances, even if the top land 316 or other portion of the piston head 310 bears against the major thrust side of the cylinder wall, the thrust reaction forces at the piston head 310 (represented as force centroid R2) are significantly smaller than the thrust reaction forces on the piston skirt (represented as force centroid R1). As such, the wear caused by the piston head 310 may be small or insufficient to cause substantial scuffing.

Referring to FIGS. 6 and 7, the radial offset 364 may substantially reduce or eliminate the contact between the cylinder wall and the upper skirt portion 358. As such, the thrust load may be substantially distributed along two parts of the major thrust side 330—along the piston skirt 320 and along the piston head 310. These two parts may bear a different set of thrust reaction forces, which are represented as force centroid R1 and force centroid R2. Due to the axial profile shape of the skirt 320 and due to the radial offset 364 of the upper skirt portion, the force centroid R1 may occur at or slightly below the centerline 317 of the wrist pin (proximal to the maximum radius point 355). Also, because the piston head 310 may bear against the cylinder wall in response to a thrust force, the force centroid R2 may occur along the major thrust side of the piston head (e.g., proximal to the second land 318 or the top land 316, and in this embodiment, above the third land 319).

Presuming that the piston 300 has no transverse acceleration force (this presumption is valid once the piston is pushed up against the cylinder liner after it moves due to secondary motion), the thrust reaction forces can be expressed as a function of the thrust force which is transmitted through the pin centerline 317 (represented as force T in FIG. 6). These expressions are as follows:

$$R1=\left(\frac{X2}{X1+X2}\right)T \text{ and } R2=\left(\frac{X1}{X1+X2}\right)T$$

where X1 is the axial position of the centroid of the thrust reaction forces on the piston skirt 320 (represented as force centroid R1) relative to the height of the wrist pin centerline 317, and where X2 is the axial position of the centroid of the thrust reaction forces on the piston head 310 (represented as force centroid R2) relative to the height of the wrist pin centerline 317 (refer, for example, to FIG. 6).

Because the radial offset 364 may substantially reduce or eliminate the contact between the cylinder wall and the upper skirt portion 358, and due to the maximum radius point 355 being located at or near the height of the wrist pin centerline 317, the centroid (R1) of the thrust reaction forces on the piston skirt 320 may occur at or slightly below the height of the wrist pin centerline 317 so that X1 is relatively small (e.g., X1<<X2). When X1 is much smaller than X2, the centroid (R2) of the thrust reaction forces on the piston head 310 becomes relatively small (e.g., R2 <<R1). In such circumstances where R2 is much smaller than R1, the thrust force (T) is substantially countered by the reaction forces on the piston skirt 320 (e.g., when R2<<R1, then R1≅T). Accordingly, the thrust reaction forces on the piston head 310 (represented as centroid R2) may be substantially reduced, and the wear associated with the thrust reaction forces on the piston head 310 will likewise be reduced. As such, the wear caused by the piston head 310 may be small or insufficient to cause substantial scuffing, and the piston 300 may be configured to have a substantially smaller clearance gap between the top land 316 that the cylinder wall. A tight clearance gap may reduce the volume between the cylinder wall and piston head 316 above the sealing ring of the top land 316 (i.e. the crevice volume). Combustion mixture received in the crevice volume is typically not fully combusted and is thus exhausted as unburned hydrocarbons. The reduced crevice volume reduces the amount of unburned combustion mixture exhausted as undesirable emissions, because the volume of unburned combustion mixture is smaller. Furthermore, the tighter clearance gap between the top land 316 and the cylinder wall and the lower magnitude of the thrust reaction forces on the piston head 310 may substantially reduce wear on the top land 316, the piston ring(s), and the cylinder wall.

Still referring to embodiments and examples described in connection with FIGS. 6-7, the axial profile of the piston skirt 320 may be configured so that the reaction force centroid (R1) is aligned at or slightly below the height of the wrist pin centerline 317. For example, the radial offset 364 may be increased to further reduce the amount of upper skirt portion 358 that bears upon the cylinder wall, which may cause the reaction force centroid (R1) to be located at a lower axial position on the skirt 320. Also, the lower skirt portion 354 may include the maximum radius 355 proximal to the height of the wrist pin center line 317 so that as the thrust load increases and deflects the piston skirt 320, the loaded area of the skirt 320 may increase but the centroid (R1) of the thrust reaction forces on the piston skirt 320 may remain at or slightly below the pin centerline 317. In such circumstances, the magnitude of centroid (R1) for the thrust reaction forces on the piston skirt 320 would not exceed the magnitude of the thrust force (T). (If the reaction force centroid (R1) migrated towards the upper portion of the piston skirt 320, the axial position (X1) would have a negative value, thus causing the magnitude of reaction force centroid (R1)to be greater than the magnitude of the thrust force (T).)

A number of embodiments of the invention have been described. Nevertheless, it will be understood that various modifications may be made without departing from the scope of the invention. For example, the minor thrust side axial profile can, in some instances, be different than the major thrust side axial profile. Also, in instances where the axial profiles on the major and minor thrust sides are substantially the same, the radius one side may be different from the radius of the other. Accordingly, other embodiments are within the scope of the following claims.

What is claimed is:

1. An internal combustion engine, comprising:

at least one wall defining a bore; and a piston disposed in the bore and coupled to a piston rod to pivot about a pivot axis, the piston comprising a substantially circumferential outer surface having a head portion and a skirt portion below the head portion, at least a portion of the outer surface bearing against the wall in a thrust plane when the piston is substantially at operating temperature and subject to a thrust force, the portion of the thrust force borne by the skirt portion in the thrust plane is definable by a skirt force centroid, the skirt force centroid being positioned at an axial height substantially at the pivot axis or below the pivot axis, wherein the skirt portion includes a skirt wall having a wall thickness in the thrust plane that varies relative to the axial height so that the skirt wall has greater radial rigidity above the pivot axis.

2. The engine of claim 1, wherein the outer surface includes a lower skirt portion, an intermediate skirt portion, and an upper skirt portion, the intermediate skirt portion including a concave curvature in the thrust plane when the piston is substantially at operating temperature.

3. The engine of claim 1, wherein the outer surface includes a lower skirt portion, an intermediate skirt portion, and an upper skirt portion, the outer surface having a radial offset in the thrust plane above the pivot axis when the piston is substantially at operating temperature.

4. The engine of claim 1, wherein the outer surface includes a lower skirt portion, an intermediate skirt portion, and an upper skirt portion, lower skirt portion having a maximum radius that is in an interference fit with the wall when the piston is substantially at operating temperature.

5. The engine of claim 4, wherein the lower skirt portion flexes when in the interference fit to avoid seizure of the piston in the bore.

6. The engine of claim 4, wherein the lower skirt portion is spring-loaded against major and minor thrust sides of the wall when in the interference fit with the wall.

7. The engine of claim 6, wherein the outer surface is operable to guide the piston in the bore when the lower skirt portion is spring-loaded against major and minor thrust sides of the wall.

8. The engine of claim 6, wherein when the lower skirt portion is spring-loaded against major and minor thrust sides of the wall, the upper skirt portion is radially offset from the major thrust side of the wall in the thrust plane.

9. The engine of claim 1, wherein the piston further comprises a polar profile in a radial plane and the polar profile being asymmetrical about the pivot axis.

10. The engine of claim 1, wherein the skirt force centroid is positioned at an axial height directly at or below the pivot axis.

11. An internal combustion engine, comprising:

at least one wall defining a bore; and a piston disposed in the bore and coupled to a piston rod to pivot about a pivot axis, the piston comprising an outer surface having a head portion and a skirt portion below the head portion, at least a portion of the outer surface bearing against the wall in a thrust plane when the piston is substantially at operating temperature and subject to a thrust force, the portion of the thrust force borne by the skirt portion in the thrust plane is definable by a skirt force centroid, the skirt force centroid being positioned at an axial height substantially at the pivot axis or below the pivot axis, wherein the skirt portion is at least partially defined by a lower skirt portion, an intermediate skirt portion, and an upper skirt portion, the intermediate skirt portion including a concave curvature in the thrust plane when the piston is substantially at operating temperature.

12. The engine of claim 11, wherein the skirt portion includes a skirt wall having a wall thickness in the thrust plane that decrease from the intermediate skirt portion to the lower skirt portion.

13. The engine of claim 11, wherein the outer surface has a radial offset in the thrust plane above the pivot axis when the piston is substantially at operating temperature.

14. The engine of claim 11, wherein the lower skirt portion includes a maximum radius that is in an interference fit with the wall when the piston is substantially at operating temperature.

15. The engine of claim 14, wherein the lower skirt portion flexes when in the interference fit to avoid seizure of the piston in the bore, the lower skirt portion being spring-loaded against major and minor thrust sides of the wall when in the interference fit with the wall.

16. The engine of claim 11, wherein the skirt force centroid is positioned at an axial height directly at or below the pivot axis.

17. A piston for use in an engine having a bore wall so that, when the piston is substantially at operating temperature and subject to a thrust force, the piston pivots about a pivot axis to bear against the bore wall in a thrust plane, the piston comprising:

an outer surface in the thrust plane having a head portion and a skirt portion below the head portion, the head portion having at least some radii in the thrust plane that are larger than at least some of the radii of the skirt portion when the piston is substantially at operating temperature so that the outer surface has a radial offset in the thrust plane above the pivot axis, the outer surface to bear at least a portion of the thrust force in the thrust plane, wherein the portion of the thrust force borne by the skirt portion in the thrust plane is definable by a skirt force centroid, the skirt force centroid being positioned at an axial height substantially at the pivot axis or below the pivot axis, and wherein the skirt portion includes a skirt wall having a wall thickness in the thrust plane that decreases from an upper skirt portion to a lower skirt portion.

18. The piston of claim 17, wherein the portion of the thrust force borne by the head portion is definable by a head force centroid, the head force centroid being substantially smaller in magnitude than the skirt force centroid.

19. The piston of claim 17, wherein the outer surface includes a lower skirt portion, an intermediate skirt portion, and an upper skirt portion, the intermediate skirt portion including a concave curvature in the thrust plane when the piston is substantially at operating temperature.

20. The piston of claim 17, wherein the skirt force centroid is positioned at an axial height directly at the pivot axis or below the pivot axis.

* * * * *